Oct. 25, 1966  L. P. FABER, JR., ET AL  3,280,937
APPARATUS FOR MEASURING THE FREQUENCY OF ACOUSTICAL ENERGY
Original Filed June 1, 1961
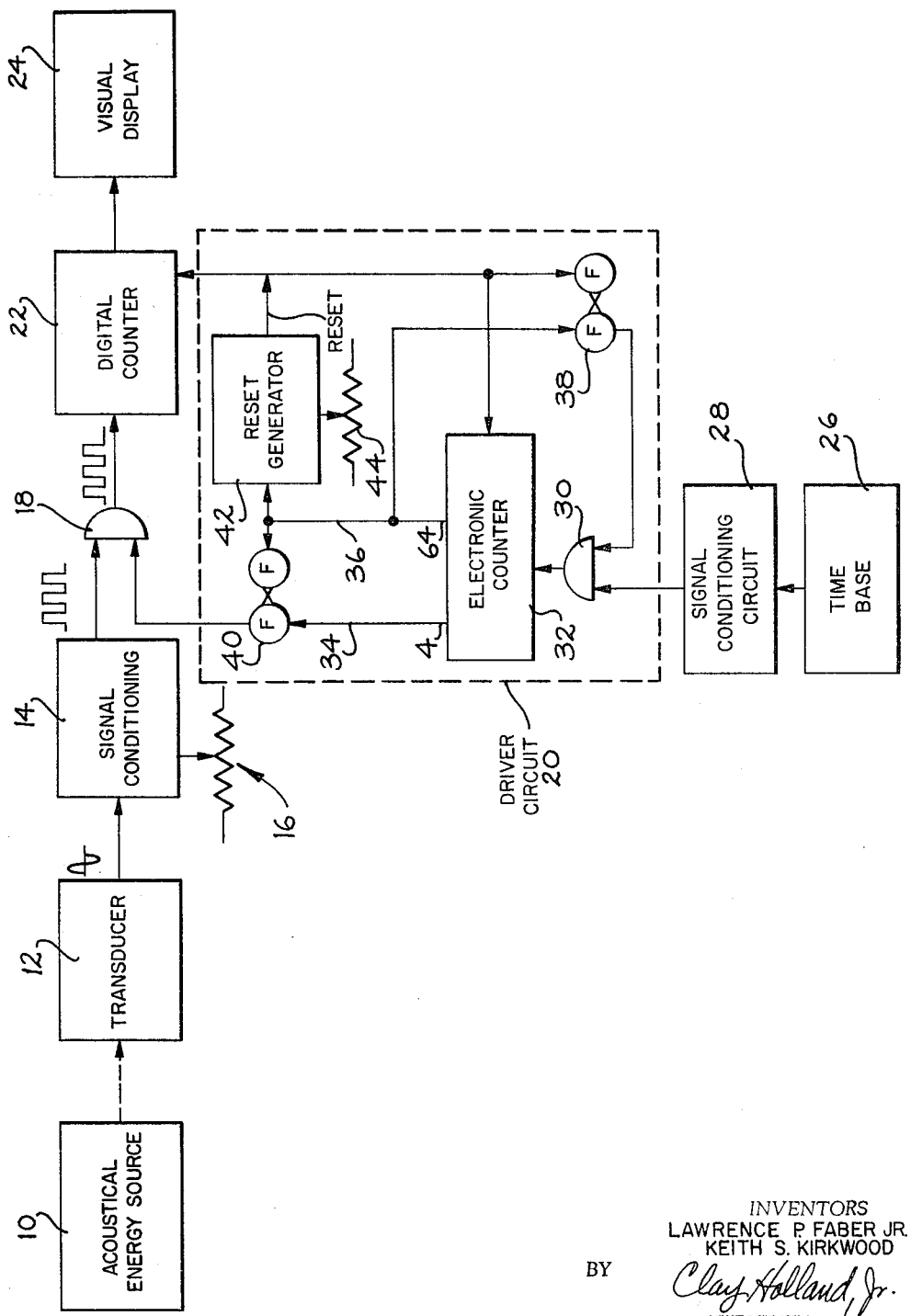
INVENTORS
LAWRENCE P. FABER JR.
KEITH S. KIRKWOOD
BY
ATTORNEY

United States Patent Office 3,280,937
Patented Oct. 25, 1966

3,280,937
APPARATUS FOR MEASURING THE FREQUENCY OF ACOUSTICAL ENERGY
Lawrence P. Faber, Jr., 3127 David Ave., Palo Alto, Calif., and Keith S. Kirkwood, 10633 S. Blane Ave., Cupertino, Calif.
Original application June 1, 1961, Ser. No. 114,163, now Patent No. 3,144,802, dated Aug. 18, 1964. Divided and this application Feb. 6, 1964, Ser. No. 349,520
1 Claim. (Cl. 181—.5)

This is a division of application Serial No. 114,163, filed June 1, 1961, now U.S. Patent No. 3,144,802.

This invention relates to an electronic apparatus for measuring the frequency of acoustical energy and more particularly to a solid state device electronic apparatus for measuring the frequency of acoustical energy whereby the acoustical energy is converted into an electrical signal having a frequency corresponding to that of the acoustical energy and apparatus for recording the same.

Prior to the advent of electronic apparatus, pianos and other instruments were tuned by an artisan who listened concurrently to the pitch of a tuning fork vibrating at a frequency corresponding to a key note and to the pitch of the corresponding piano string. Tuning of pianos and other instruments by this practice requires a highly trained human ear and is very time consuming. In addition, such practices are not amenable to automation.

With the advent of electronic apparatus, many forms of electronic tuning devices for pianos and other instruments have been proposed to obviate the disadvantages of the aforementioned practice. One such electronic apparatus proposes comparing a known frequency standard, such as the output frequency of a crystal oscillator, with the frequency of the note being measured. The reference frequency signal provides a sine wave image on a cathode ray screen, the cathode ray tube being a part of the apparatus, the reference signal having a predetermined horizonal sweep rate. In theory, if the note being tuned is flat, the image on the screen will appear to be running to the left and when the instrument being tuned is sharp, the image will appear to be running to the right. Thus, in theory, when the image is stationary, the note is presumed to be in tune. It has been found in practice that the operator cannot accurately determine the degree of flatness or sharpness of a note when viewed on the cathode ray tube screen. This is so because there is no simple way to indicate by the speed of travel of the sweep of the sine wave, how close or how far away from a flat or sharp the measured signal is. Thus the operator using such a tuning device must have sufficient skill and knowledge in the use of an oscilloscope to know when the note being tested is approximately flat, sharp, or in tune, since the visual display of tuning process is not a direct reading of the frequency. One of the most striking disadvantages of such a system is the inaccuracy in the measurement which arises from errors of the operator in reading and interpreting the information shown on the oscilloscope employed with the apparatus. Since the operator is unable to determine from the rate of speed at which the sine wave sweeps across the cathode ray tube screen the exact frequency of the note measured, he must always guess and he can never be absolutely sure of his guess. In addition, the size of the oscilloscope, if it is a small sized one, may increase the possibility for additional error. Another disadvantage arises from the fact that relatively elaborate frequency dividing circuitry is required to provide a frequency standard which is capable of selecting each frequency that is desired to be measured. Thus the acuracy of the measurements is dependent upon the accuracy of the dividing circuitry and the ability of the operator to read and interpret the information displayed on the oscilloscope.

Another form of apparatus proposed heretofore is the so-called "stroboscope" arrangement, wherein the purpose of the device is to measure the difference in frequency between two simultaneously sounded tones. In operation the received signals excite one or more stroboscope illumination lamps at a rate equal to two times the said frequency difference. A principal disadvantage of this apparatus arises from the fact that there is the possibility that the operator will make errors in his observations and interpretations of the information present on the stroboscope disc. Thus one unfamiliar with the use of the stroboscopic disc is likely to find the tuning process somewhat more inaccurate and difficult than is desired. In addition, the readings from the disc are not direct frequency readings. The stroboscope disc has a plurality of concentric bands which represent the frequencies measured by the device. A serious disadvantage arises in using the disc because it is possible for the disc to show two different frequencies, that is the frequency which may be a harmonic of the frequency of the note being tuned. The operator is required to have some skill and knowledge of music, in the instance of the piano, so that he will know what note and frequency he is tuning for. Thus this device is extremely limited in its usefulness, since a skilled musician is needed.

Still another disadvantage of the stroboscopic disc device arises from the fact that the lamps, which may be small low power neon lamps or other lamps which operate by ionization of a gas, do not stay lighted long enough nor do they have a high enough light level when lighted at the lower frequencies to enable the operator to accurately read the stroboscopic disc. While at the higher frequency the usefulness of the device is lessened by the fact that the illumination or neon lamps employed in the apparatus are substantially incapable of responding, that is switching on and off, fast enough to provide an accurate count of the frequency of the device being tuned.

Thus it can be readily appreciated by those versed in the frequency measuring art that one could not expect to get very accurate measurements with the aforementioned prior art devices. More particularly, one could not expect to measure the frequency of a note within one or two cycles at either the high or low frequencies.

The present invention overcomes the foregoing and other problems associated with the prior art manual and electronic devices for measuring the frequency of acoustical noise. In accordance with one concept of the invention there is provided a transistorized apparatus for measuring and recording in numerical form the sound vibrations of acoustical noise which has been converted to electrical impulses by an suitable transducer used for that purpose. This apparatus displays the exact frequency of the acoustical energy and the operator always knows precisely where he is after each measurement.

More particularly, according to the invention, acoustical energy is received by a transducer, such as a microphone or crystal pick-up for examples, and converted to an electrical output signal, such as a sine wave, having a frequency exactly equal to the frequency of the sound vibrations. The electrical signal from the transducer is fed into a signal conditioning circuit which may include an amplifier, a pulse shaper and a threshold control, or a Schmitt trigger circuit. The output of the signal conditioning circuit may be a train of pulses whose pulse repetition rate is equal to the frequency of sound vibrations which is fed into an "and" gating logic, which is held open for a specified time by a control gating signal from a timing control circuit. The pulse trains which pass through the gate during the counting cycle are counted and recorded by a counting system and may be displayed visually by an associated display system. In tuning pianos and other devices in accordance with the present invention, the frequency of the note being tuned may be presented on an accompanying reference display for ready reference and the operator is only required to adjust the tension of the string or other tuning mechanisms so that the number of pulses counted corresponds to the number representing the desired frequency shown on the reference display. The reference display may be a part to the measuring apparatus or a separate unit. The reference display may include the facilities for establishing a range defined by an upper and lower frequency limit as opposed to a single frequency as the reference. With a capability of this type the operator can set the limits as close to the desired frequency as he likes, being limited only by his own physical capabilities in making the adjustment.

According to another illustrative embodiment of the invention, there is provided an apparatus for automatically measuring and comparing successively the frequency of a plurality of acoustical energy sources, such as organ pipes for example, with preselected frequency limits for each organ pipe. This embodiment of the invention includes components similar to the embodiment discussed hereinabove, while it also includes additional circuitry for selecting the specific organ pipe to be tuned, exciting the pipe and measuring and comparing the frequency of the noise generated by the pipes. The resulting frequency measurement is compared with a preselected reference number. If the two frequencies do not compare favorably the system automatically adjusts, energizes, converts and compares at the adjusted point. This cycling process may continue for several times until the desired tune is obtained. The device automatically advances to the next organ pipe if the measured frequency substantially matches that of the reference standard.

It is therefore an object of the present invention to provide an improved electronic apparatus for measuring frequency of acoustical energy.

Another object of this invention is to provide an electronic apparatus which is capable of measuring and recording the precise frequency of acoustical energy and displaying the same visually.

Still another object of this invention is to provide an electronic apparatus for automatically exciting a plurality of acoustical energy sources in turn according to a preselected pattern and comparing the frequencies thereof with a reference standard and repeating the cycle until the measured frequencies match that of the reference standard.

Yet another object of the invention is to provide an electronic apparatus which is operable by a person of minimum technical skill and training, and by which the frequency measured may be read directly and exactly from a numerical display.

A further object of the invention is to provide a tuning apparatus which may be designed using all solid state devices so that it is light in weight and small in size.

The novel features which are believed to be characteristic of the invention, both as to organization and method of operation, together with further objects and advantages thereof, will be better understood from the following description considered in connection with the accompanying drawings in which several embodiments of the invention are illustrated by way of example. It is expressly understood, however, that the drawings are for the purpose of illustration and description only, and are not intended as a definition of the limits of the invention.

The figure is a block diagram showing an arrangement of electronic circuits and associated devices illustrating one form of electronic apparatus for measuring the frequency of acoustical energy in accordance with the invention.

Referring now to the drawings, wherein the same reference characters designate like or corresponding parts or circuits throughout the several views, there is shown in the figure an arrangement of circuitry utilized in one illustrative embodiment of the invention. Since several of the circuits illustrated in the figure may be composed of elements of standard types commercially available, no detailed schematic diagrams are necessary for certain circuits. A description of the functions and the manner in which the various circuits cooperate will be discussed in detail hereinafter.

As shown in the figure an acoustical energy source 10 is capable of producing acoustical energy which it thereafter transmits to a suitable transducer 12. For purposes of this embodiment a microphone is usable as the transducer when only one instrument is being tuned at a time. If it is desirable to tune more than one instrument at the same time in the same room, a crystal pick-up type transducer should be employed. Thus the noise vibrations are taken directly from the vibrating element and interference is eliminated.

Continuing with the description with reference to the figure, the transducer 12 converts the received acoustical signal into an electrical output signal having the form of a sine wave. The frequency of the output sine wave is exactly the same as that of the initial acoustical signal. The output sine wave of the transducer is then fed into a signal conditioning circuit 14. Circuit 14 may include an amplifier, and pulse shaper such as a Schmitt trigger circuit with a threshold control generally designated 16. The output signal of circuit 14 being a pulse train is imposed upon an "and" gate logic 18. The gate 18 is held open by a control gate signal from a driver circuit 20.

The counter 22 may be any suitable counter such as a conventional $2^n$ binary counter. Other counters such as the ring of ten decade counter may be preferable. As the pulses pass through gate 18, they are received by a digital counter 22 and the total count display on a suitable visual display 24. The number of pulses recorded by the counter 22 may be displayed by the visual display 24 for any predetermined time such as fraction of a second or several seconds, which may be determined by a preselected time setting of a reset generator included in driver circuit 20.

Referring again to the figure, a time base 26 is utilized to provide a reference standard for generating the pulses employed to open and close gate 18 at preselected time intervals. In this illustrative embodiment, the time interval during which the gate 18 is held open has been chosen as one second. Any convenient time may be chosen. For simplicity, in the present case one second was chosen because this gives a direct readout of the counter in cycles per second and corresponds to time base of a 60 cycle which may be used as the reference standard. Thus, during the one second time interval, 60 pulses are fed through gate 30 and in turn to an electronic counter 32 which in turn produces a control signal for gate 18. Other more elaborate reference standards may be utilized, for example a precision crystal oscillator may be employed.

The signal from the reference standard or time base 26 is fed to a second conditioning circuit 28 similar to circuit 14. The output signal from circuit 28 is a train of pulses corresponding to one pulse per cycle of the frequency of the standard. The resulting pulse train is fed to a count gate 30 which is a component circuit of the driver circuit 20.

The pulse train output from gate 30 is fed to an electronic counter 32. Electronic counter 32 may be a series of flip-flop circuits with capacity enough to accommodate the counting cycle. This counter has two output channels 34 and 36. Channel 34 is energized initially and supplies the control signal to gate 18 after passing through a first flip-flop circuit 40. After 60 cycles, corresponding to one second, the second channel 36 is energized. A portion of the signal goes to circuit 40, cutting off the energy to gate 18, thus stopping the count. Another portion of the signal goes to a reset generator 42. The reset generator 42 includes a reset time control element 44. The primary function of the reset generator is to provide a device by which the operator may vary the length of time for each reading period and starting the counting cycle. A preselected setting of element 44 will determine the period which the count will be held by digital counter 22 and displayed by display 24. Yet another portion of signal 36 is fed to a second flip-flop circuit 38. In its initial state it permits the signal from the signal conditioning circuit 28 to pass through gate 30. Its other function is to close gate 30 in response to the second signal 36 from counter 32 and open the gate again in response to the delayed signal from the reset generator 42.

It should be noted at this point that the circuitry of the present invention has been transistorized. For example, with reference to FIGURE 1, the first signal conditioning circuit 14, gate 18, digital counter 22, second signal conditioning circuit 28, gate 30, counter 32, flip-flop circuits 42 and 38, and reset generator circuit 42 are all transistorized. Thus the apparatus may be made light in weight and small in size. In the present specification and claims the term transistorized is used and as used is intended to mean the use of all types of semi-conductor devices where appropriate.

Consider now the advantages which are provided by the novel electronic tuning apparatus of the invention. Owing to the unique direct read-out feature of the apparatus, such as a numerical figure presented by the visual display 24, the apparatus provides an unusually accurate aid to one tuning a musical instrument such as a piano or making other frequency measurement of acoustical energy devices. No known apparatus heretofore available has had this feature. Furthermore, the simplicity and ease of operation of the apparatus enables one unfamiliar with electronic equipment and music to tune a musical instrument, such as the piano, with precision accuracy while requiring a minimum amount of time and effort for tuning. Finally, the transistorized circuitry enables the apparatus to be produced as a small size portable equipment requiring less power than heretofore available devices.

Finally, the present invention provides two arrangements wherein semi-conductor devices may be readily adapted to use. It will be appreciated that the size, weight, power requirement and reliability are features which may be included in the present invention with the use of semi-conductor devices. The simplicity of the circuitry employed by the present invention permits the use of readily available semi-conductor components and parts.

While the electronic frequency measuring apparatus of the invention has been described with reference to several particular embodiments, it will be understood that various modifications could be made in the construction thereof without departing from the spirit and scope of the invention. Accordingly, it is expressly understood that the foregoing description shall be interpreted only as illustrative of the invention and that the claim be accorded as broad an interpretation as is consistent with the basic concepts herein taught.

What is claimed as new is:

In a system for measuring the frequency of an oscillating acoustical energy wave generated by a musical instrument, means for shaping the wave to form a train of pulses and means for counting the pulses of said first mentioned means comprising a first "and" gate logic circuit for passing the pulses from said first mentioned means, a digital counter connected to the output of said first "and" gate logic circuit, a driver circuit for applying an "and" signal to said first "and" gate, said driver including a second "and" gate logic, an electronic counter series connected to said second "and" gate and having a pair of output terminals, a first flip-flop circuit connected to said one output terminal of said electronic counter, a reset circuit and a second flip-flop circuit connected to said other output terminal of said electronic counter and said first flip-flop circuit, said first flip-flop, reset and second flip-flop circuits each having an output terminal, the output terminal of said first flip-flop circuit being connected to said first "and" gate, the output terminal of said reset circuit being connected to said digital counter, said electronic counter and said second flip-flop, and the output terminal of said second flip-flop being connected to said second "and" gate, and a time base device series connected to a signal conditioning circuit having an output terminal, the output terminal of said signal conditioning circuit being connected to said second "and" gate for actuating said driver circuit.

References Cited by the Examiner
UNITED STATES PATENTS

| | | | |
|---|---|---|---|
| 2,743,419 | 4/1956 | Chatterton et al. | 324—78 |
| 2,909,727 | 10/1959 | Andersen | 84—454 X |

BENJAMIN A. BORCHELT, *Primary Examiner.*

M. F. HUBLER, *Assistant Examiner.*